UNITED STATES PATENT OFFICE.

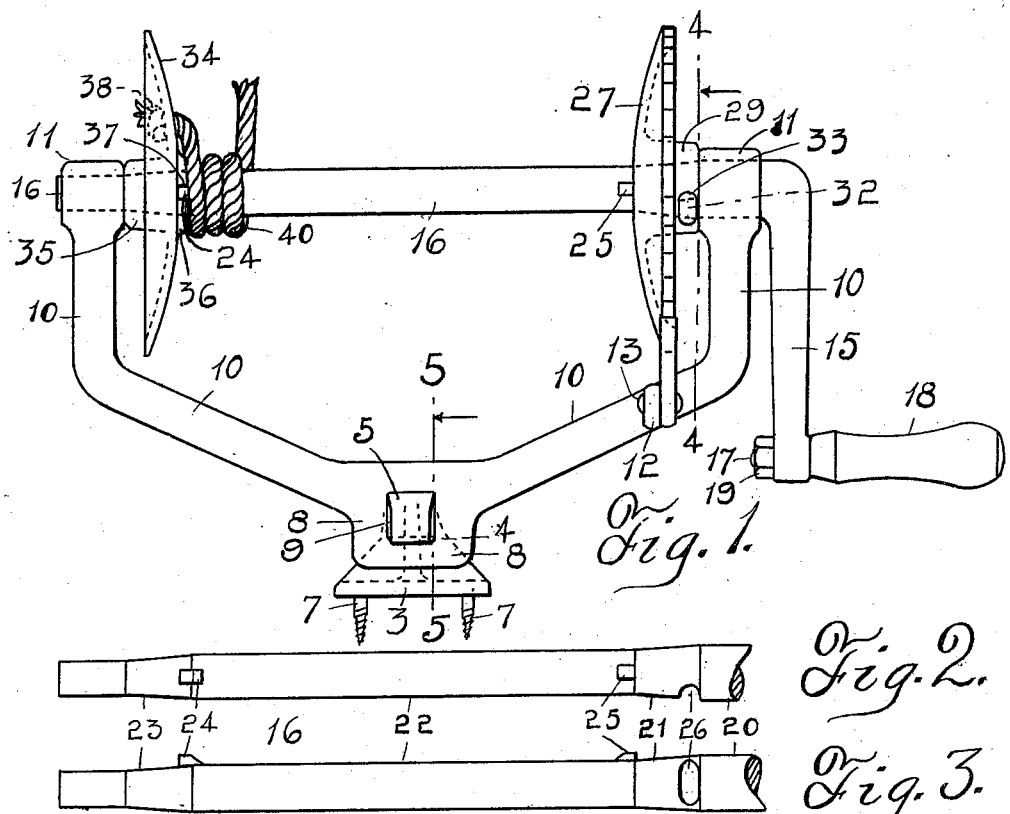

HARRY L. YOUNGREN, OF GALESBURG, ILLINOIS.

REEL.

983,795.

Specification of Letters Patent.

Patented Feb. 7, 1911.

Application filed June 21, 1909. Serial No. 503,407.

*To all whom it may concern:*

Be it known that I, HARRY L. YOUNGREN, a citizen of the United States, residing at Galesburg, in the county of Knox and State of Illinois, have invented a new and useful Reel, of which the following is a specification.

My invention relates generally to reels or windlasses, and particularly to that class or type thereof which are employed for domestic purposes, as, for instance, clothes-line reels. It will be evident, however, as the nature of the invention is more fully disclosed and better understood, that its uses are not limited to such purposes, but that it may be used as a wire-stretcher, as a hoister, and for various purposes too numerous to here enumerate.

The principal object of the invention is to so construct the several parts of the reel that they may be easily and economically assembled.

Other objects will be in part obvious and in part pointed out.

The invention accordingly consists in the features of construction, combinations of elements, the selective arrangement and disposition of parts for co-action, and in the means for carrying out the foregoing recited objects.

In the accompanying drawings, which illustrate my invention embodied in the best manner now known to me:—Figure 1 is a top plan of the device, assembled and in position for use, a fragment of a line being shown thereon; Fig. 2 is a fragmental detail of the shaft, it being shown in the same position as at the principal figure; Fig. 3, a similar view, a rear elevation; Fig. 4, a sectional view, partly in elevation, taken in the line 4—4 in Fig. 1; and Fig. 5, a detail sectional view, partly in elevation, taken in the line 5—5 in Fig. 1.

Referring to the drawings by numerals. the same one indicating the same part in the different figures, 2 indicates a bracket comprising a plate 3 having a forward extension 4 from which projects upwardly a hook-line supporting-arm 5, preferably square in its cross-section at its lower portion, and its upper and forward portion formed substantially in the arc of a circle, whereby the hereinafter described angular aperture in the reel-frame may be readily slipped thereover and without friction or binding. The plate 3 is apertured at 6 for the reception of screws 7 and, as is evident, is of such small size that it may be secured thereby to any ordinary post or small tree.

The yoke or frame of my device comprises a head 8 provided with a preferably square opening 9 adapted to fit freely over the bracket-arm 5 but which is of such limited area that it will neither turn nor wabble thereon. Should its weight tend to drag it downwardly, or the rear wall of the aperture 9 upwardly and forwardly, it will be restrained by the rearwardly turned projection on the arm 5. Arms 10 extend substantially laterally and thence forwardly from the head 8 and their ends 11 are enlarged and provided with registering eyes, only inferentially shown. On one of the arms 10 is an ear 12 provided with a transverse aperture for the reception of a rivet 13 by which a gravity pawl 14 is pivoted thereto.

The crank-arm 15 and its shaft 16 are preferably cast integral, the arm being transversely apertured for the reception of a threaded bolt 17 on which the handle is secured by means of a nut 19. It will be evident that the handle may be formed integral with the crank-arm if preferred. The shaft 16 is greatest in diameter at its inner portion 20, thence somewhat tapered at 21, constricted at 22, and again tapered at 23. It is provided with lugs 24, 25, respectively near its outer and inner ends, and the portion 21 is transversely channeled at 26 for a purpose presently described.

A concavo-convex ratchet-disk provided with openings 28 for the line-end, and having transverse openings 32 through the walls of its hub 29, is provided with a central aperture 30 which is longitudinally channeled at 31 to provide a way for the lugs 24, 25. It is positioned by sliding it along on the shaft, passing said lugs through said way, and giving it a part-revolution to bring the channel 26 into alinement with the openings 32, whereupon a cotter is seated therein. The disk is thus held to be revolved by and with the shaft and is held from outward movement by the lug 25. The disk 34 is also preferably concavo-convex and is provided with a hub 35, on its outer face and a hub 36 on its inner face, the latter having a notch 37 which receives the lug 24, which lug prevents either endwise or revoluble movements of said disk. Apertures 38 provide a means for securing the end of the line 39 in an ordinary manner. No nut is required on the point of the shaft, as the cotter prevents its escape from the eyes 11 in the ends of the yoke.

While I have specifically illustrated and described the preferred construction and assemblage of the several parts of my improvements, yet I do not desire to be understood as confining myself to such limitations, inasmuch as some of these improvements may be used without the others, and in devices differing in construction and organization from the one shown.

Having thus set forth the construction and operation, the purposes and advantages of the invention, I claim as new and desire to secure by Letters Patent the following, to-wit:—

A reel comprising a frame having oppositely disposed arms, each thereof provided with an eye at its end, a shaft mounted therein and provided with a lug near each of its ends and a transverse groove, a disk having a projecting hub mounted on said shaft, there being a transverse opening in said hub and a longitudinal way in its axial bore through which said lugs are adapted to pass when said disk is moved from one end of the shaft to the other, a cotter seated in said transverse opening and groove, whereby said wheel is locked from endwise movement and from revolution on said shaft, and a disk provided with a hub on each of its faces and a notch in one of them, one of said lugs seatable in said notch and the other hub contacting the inner portion of one of the frame-arms.

In witness whereof I hereto affix my signature at Galesburg, Knox county, Illinois, this 16th day of June, 1909.

HARRY L. YOUNGREN.

Witnesses:
 FRANK A. YOUNGREN,
 H. M. RICHARDS.